July 22, 1958    J. W. EMMERSON    2,844,697
ELECTRIC SOLDERING TOOLS
Filed Jan. 23, 1956    2 Sheets-Sheet 1
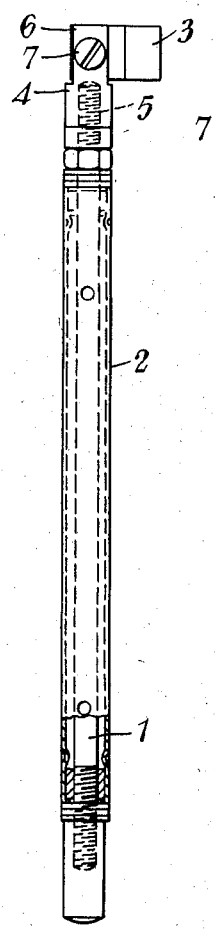
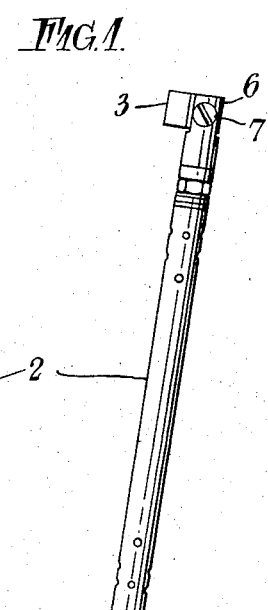
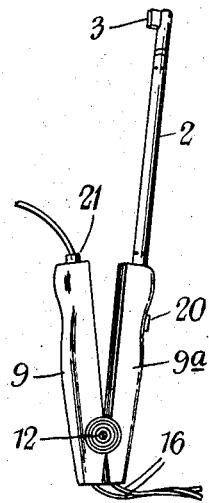
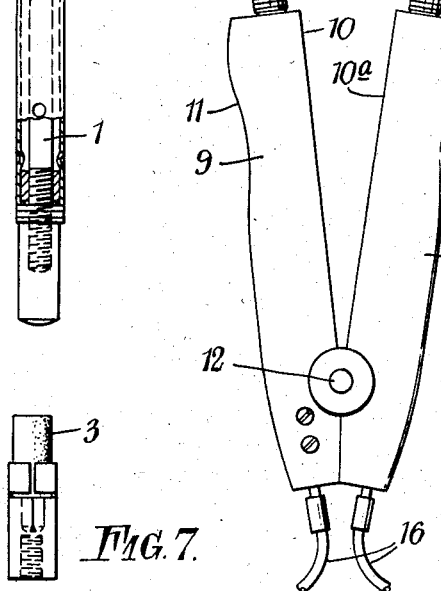

July 22, 1958 — J. W. EMMERSON — 2,844,697
ELECTRIC SOLDERING TOOLS
Filed Jan. 23, 1956 — 2 Sheets-Sheet 2
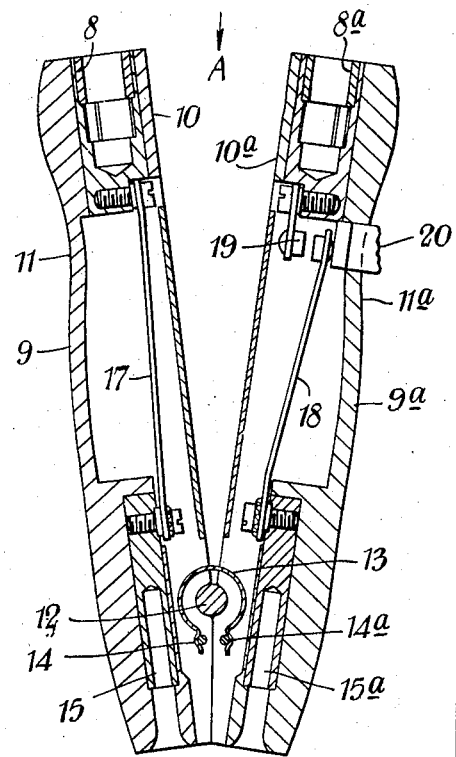
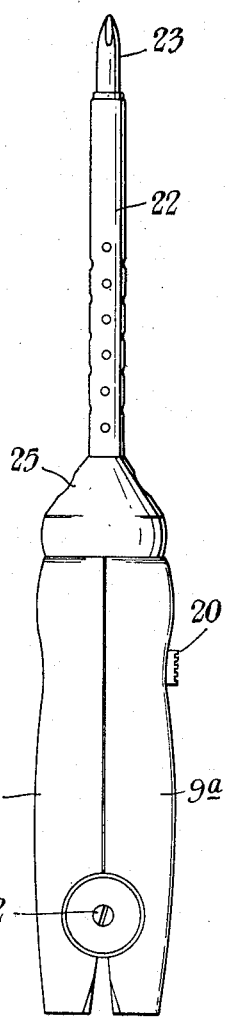
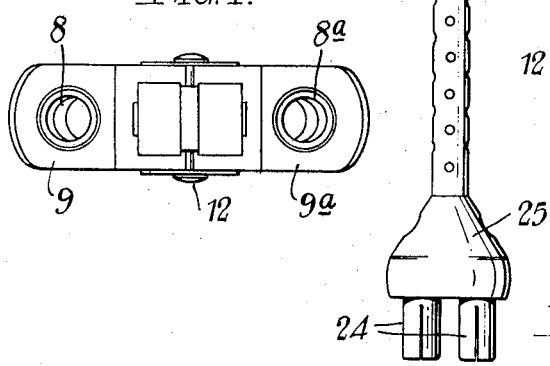

2,844,697
ELECTRIC SOLDERING TOOLS

James William Emmerson, Bexleyheath, England

Application January 23, 1956, Serial No. 560,615

Claims priority, application Great Britain January 24, 1955

10 Claims. (Cl. 219—26)

This invention relates to electric soldering apparatus.

According to the invention there is provided electric soldering apparatus comprising first and second longitudinally-extending handles made of electrically insulating material, a pivotal connection between the handles near one end thereof, first and second electrically conductive arms adapted for individual detachable mounting on the other ends of the first and second handles, an electrode detachably mounted on each conductive arm, a conductor in each handle for making an electrical connection between the associated conductive arm and an external circuit, a switch in the first handle for making and breaking said electrical connection, and resilient means effective between the two handles for urging said other ends apart.

The said conductive arms are preferably interchangeable with a soldering device having a single heating element and carrying a soldering bit. With this device attached to the handles, current flows through the heating element and through the conductors in both handles so that the apparatus may be used in the manner of an ordinary electric soldering iron. Alternatively, it is possible to have one conductive arm mounted on the holder and an earth-return lead connected to the holder in place of the other conductive arm, so that an earthed workpiece can be soldered using only one electrode.

For a better understanding of the invention and to show how the same may be readily carried into effect reference will now be made to the accompanying drawings in which:

Figure 1 is a front view of a soldering tool constructed according to the invention.

Figure 2 is a cross-sectional view of the handles of the tool with the conducting arms and power supply leads removed.

Figure 3 is a part-sectional view of one of the conducting arms.

Figure 4 is an end view of the handles looking in the direction of the arrow A in Figure 2.

Figure 5 is a front view of the tool showing one of the conducting arms removed and substituted by an earth return lead to enable the tool to be used for soldering by the employment of a single electrode.

Figure 6 is a view of a modified form of conducting arm.

Figure 7 is a view of an alternative form of electrode.

Figure 8 is a front view showing a soldering tool incorporating a single heating element and adapted to be substituted for the conducting arms.

Figure 9 is a front view showing the tool illustrated in Figure 8 attached to the handles.

Referring now to the drawings, for one mode of use the apparatus includes two conductive arms 1 each housed within a tubular sheath 2 and each carrying a carbon electrode 3 at its outer extremity. The electrodes 3 may be of any desired shape and are mounted in such manner as to be readily replaceable. Each electrode 3 is carried by a supporting member 4 which is provided with an internal screw-thread 5 (Figure 3) at its lower end to enable it to be detachably secured to the outer extremity of the conducting arm. The outer end of each supporting member 4 has a bifurcated portion 6 which is adapted to receive an electrode 3 held in place by means of a screw 7 or the like passed through apertures in the bifurcated portions 6 of the supporting member and an aperture (not shown) located in the electrode.

As will readily be seen from Figure 2 the conducting arms 1 are mounted at their inner ends by means of tubular sockets 8, 8a, located within handles 9 and 9a made of plastic or other suitable insulating material. The handles have flat inner surfaces 10 and 10a and curved outer surfaces 11 and 11a and are mounted on a pivot 12 at the ends remote from the electrodes whereby the latter can be moved relatively to each other. A curved spring 13, constituting the major portion of a circle, is disposed co-axial with the pivot 12, the free ends of the spring being held in engagement with pins 14 and 14a attached to the respective handles to maintain the handles at the required distance apart. The lower ends of the handles accommodate sockets 15, 15a, to receive plug connections on the electric current supply leads 16. Electrical connection between the tubular sockets 8 and 15 located in the handle 10 is established by means of a metal strip 17 secured at each end to such sockets by means of screws. An electric switch is housed within the handle 9a, such switch comprising a spring contact 18 attached at its lower end to the tubular socket 15a which receives the plug connector of the other power supply lead. A contact 19 is associated with the tubular socket 8a and the circuit between the contacts 18 and 19 is adapted to be completed by depression of a button 20 located in the handle 9a. If desired, both handles may be provided with an electric switch.

It will be understood that as the electrodes are spaced from each other no current flows until the tool is brought into use i. e. when the extremities of the electrodes are brought into engagement with the metal or solder at the point where it is desired to effect a joint and the switch button 20 has been depressed. The electrical circuit is then completed and current commences to flow causing the electrodes to become rapidly heated due to their high resistance. It will be understood that by virtue of the ready adjustability of the conducting arms with respect to the handles, the soldering operation can be effected in a variety of ways depending upon the position occupied by the electrodes. Thus, with the electrodes disposed in the position shown in Figure 1 the work can be gripped between the electrodes. When, however, it is not practicable to employ the tool in this manner, the conducting arms can be removed from their respective handles and replaced therein or rotated in the handles until the operative faces of the electrodes bear as closely as possible on the work to be soldered. It will also be understood that in some cases it may be necessary to substitute the electrodes shown in Figure 1 by electrodes of the kind illustrated in Figure 7 i. e. in which the electrode is disposed co-axially with respect to the conducting arm.

In some cases it may be possible to effect a suitable joint without the aid of solder, the respective parts to be joined being fused together merely by virtue of the heat generated by the electrodes.

The tool described above may be readily adapted for use in the manner of an ordinary soldering iron, i. e. having a single heating element constituted by one of the carbon electrodes. To use the tool in this manner it is merely necessary to detach one of the conducting arms by removing it from its socket and to substitute therefor an earth connection as illustrated in Figure 5. Such connection may comprise a plug member 21 carrying an earth lead and a suitable clip (not shown) whereby the appropriate connection to earth can conveniently be made. A conducting arm of the shape illustrated in Figure 6 and carrying a pointed or round electrode is particularly adapted for use in the manner just described where access to the soldering position is restricted.

In the embodiment illustrated in Figures 8 and 9 the apparatus may likewise be employed in the manner of an ordinary electric soldering iron, the conducting arms being removed from their respective sockets in the handles and a tool incorporating a single heating element is substituted for the conducting arms. Such tool comprises a tubular metal sheath 22 within which a suitable heating element is housed, the sheath carrying at its upper end a detachable bit 23. Preferably the bit is of hollow form and is provided with a brass tip. The heating element may comprise a carbon rod one end of which extends into the hollow interior of the bit while the other end is supported by the end of a spring-urged plunger member accommodated within the tubular sheath. The end of the sheath remote from the bit is provided with a pair of lug connectors 24 supported within a member 25 made of suitable insulating material. When the said plug connectors are inserted into the sockets carried by the handles, the inner flat faces of the latter will be brought into mutual contact and maintained in that position thus forming a convenient handle for the tool.

I claim:

1. Electric soldering apparatus comprising first and second longitudinally-extending handles made of electrically insulating material, a pivotal connection between the handles near one end thereof, first and second electrically conductive arms mounted on the other ends of the first and second handles respectively in such manner as to be readily detachable, a respective electrode holder connected to the outer end of each conductive arm, a bifurcation in each electrode holder, two electrodes each having a portion inserted between the branches of a respective bifurcation and each extending towards the other electrode, a respective fastening member passing through each said portion and the branches of the associated bifurcation to secure the electrodes to the holders, a conductor in each handle for making an electrical connection between the associated conductive arm and an external circuit, a switch in the first handle for making and breaking said electrical connection, and resilient means effective between the two handles for urging said other ends apart.

2. Electric soldering apparatus comprising first and second longitudinally-extending handles made of electrically-insulating material, a pivotal connection between the handles near one end thereof, first and second electrically conductive arms mounted on the other ends of the first and second handles respectively in such manner as to be readily detachable, a respective electrode holder in screw-threaded connection with the outer end of each conductive arm, a bifurcation in each electrode holder, two electrodes each having a portion inserted between the branches of a respective bifurcation and each extending towards the other electrode, a respective screw passing through each said portion and the branches of the associated bifurcation to secure the electrodes to the holders, a conductor in each handle for making an electrical connection between the associated conductive arm and an external circuit, a switch in the first handle for making and breaking said electrical connection, and resilient means effective between the two handles for urging said other ends apart.

3. Electric soldering apparatus comprising first and second longitudinally-extending handles made of electrically insulating material, a pivotal connection between the handles near one end thereof, first and second electrically conductive arms mounted on the other side of the first and second handles respectively in such manner as to be readily detachable, an electrode detachably mounted on each conductive arm, a conductor in each handle for making an electrical connection between the associated conductive arm and an external circuit, a switch in the first handle for making and breaking said electrical connection, a spring curved in the shape of a major portion of a circle and co-axial with the pivot axis of said pivotal connection and an abutment on each handle for causing the two ends of the spring to move relative to one another, when the handles are manually pressed together, such that the spring will oppose such movement.

4. Electric soldering apparatus comprising first and second longitudinally-extending handles made of electrically insulating material, a pivotal connection between the handles near one end thereof, first and second electrically conductive arms mounted on the other ends of the first and second handles respectively in such manner as to be readily detachable, an electrode detachably mounted on each conductive arm, a metallic strip anchored at one end to said first handle, a moving contact member carried at the free end of the strip, a fixed contact member secured to said first handle and forming a switch with the moving contact member, a push button operable from the exterior of said first handle for urging the strip into a position at which said contacts engage, a first conductor in said first handle, a second conductor in said second handle for connecting the associated conductive arm to an external circuit, electrical connections in said first handle between the individual contact members on the one hand and said first conductor and the first conductive arm, respectively, on the other hand such that said first conductor and the first conductive arm are electrically connected together when said contacts engage as aforesaid, and resilient means effective between the two handles for urging said other ends apart.

5. Apparatus according to claim 1 having a switch in said second handle for breaking the aforementioned electrical connection.

6. Electric soldering apparatus comprising first and second longitudinally-extending handles made of electrically insulating material, a pivotal connection between the handles near one end thereof, electrically conductive mounting means at the other end of each handle, a conductive arm connected at one end to the first handle by way of said mounting means in such manner that the arm can readily be removed, a soldering electrode detachably mounted at the outer end of the conductive arm, a conductive lead detachably connected at one end to the second handle by way of the associated mounting means, a connecting device at the other end of the conductive lead for connecting such end to earth, a metallic strip anchored at one end to said first handle, a moving contact member carried at the free end of the strip, a fixed contact member secured to said first handle and forming a switch with the moving contact member, a push button operable from the exterior of said first handle for urging the strip into a position at which said contacts engage, a first conductor in said first handle, a second conductor in said second handle for connecting said lead to an external circuit, electrical connections in said first handle between the individual contact members on the one hand and said first conductor and the conductive arm, respectively, on the other hand such that said first conductor and the conductive arm are electrically connected together when said contacts engage as aforesaid, and resilient means effective between the two handles for urging said other ends apart.

7. Electric soldering apparatus comprising first and second longitudinally-extending handles made of electrically insulating material, a pivotal connection between the handles near one end thereof, electrically conductive mounting means at the other end of each handle, a conductive arm connected at one end to the first handle by way of said mounting means in such manner that the arm can readily be removed, a soldering electrode detachably mounted at the outer end of the conductive arm, a conductive lead detachably connected at one end to the second handle by way of the associated mounting means, a connecting device at the other end of the conductive lead for connecting such end to earth, a conductor in each handle for making an electrical connection between the associated mounting means and an external circuit, a switch in the first handle for making and breaking said electrical connection, a spring curved in the shape of a major portion of a circle and co-axial with the pivot axis of said pivotal connection and an abutment on each handle for causing the two ends of the spring to move relative to one another, when the handles are manually pressed together, such that the spring will oppose such movement.

8. Electric soldering apparatus comprising first and second longitudinally-extending handles made of electrically insulating material, a pivotal connection between the handles near one end thereof, electrically conductive mounting means at the other end end of each handle, a soldering device detachably connected to both handles by way of said mounting means in such manner as to prevent relative movement between the handles, a soldering bit in said soldering device, a single heating element near said bit, means for carrying current from the mounting means of one handle to the heating element and back to the mounting means of the other handle, a conductor in each handle for making an electrical connection between the mounting means of that handle and an external circuit, a switch in the first handle for making and breaking said electrical connection, and resilient means effective between the two handles for urging said other ends apart.

9. Apparatus according to claim 8, wherein said mounting means comprise sockets and said soldering device comprises an insulating member, two conductive plugs housed in said member and adapted to engage in said sockets, a metal tube accommodating said heating element and a detachable hollow bit connected to said tube.

10. Electric soldering apparatus comprising first and second longitudinally-extending handles made of electrically insulating material, a pivotal connection between the handles near one end thereof, electrically conductive mounting means at the other end end of each handle, a soldering device detachably connected to both handles by way of said mounting means in such manner as to prevent relative movement between the handles, a soldering bit in said soldering device, a single heating element near said bit, means for carrying current from the mounting means of one handle to the heating element and back to the mounting means of the other handle, a metallic strip anchored at one end to said first handle, a moving contact member carried at the free end of the strip, a fixed contact member secured to said first handle and forming a switch with the moving contact member, a push button operable from the exterior of said first handle for urging the strip into a position at which said contacts engage, a first conductor in said first handle, a second conductor in said second handle for connecting the mounting means of the second arm to an external circuit, electrical connections in said first handle between the individual contact members on the one hand and said first conductor and the mounting means of the first arm on the other hand such that the last-mentioned conductor and mounting means are electrically connected together when said contacts engage as aforesaid, and resilient means effective between the two handles for urging said other ends apart.

References Cited in the file of this patent

UNITED STATES PATENTS

| | | |
|---|---|---|
| 1,569,796 | Watson | Jan. 12, 1926 |
| 1,829,929 | Heintzelman | Nov. 3, 1932 |
| 1,869,448 | Woodring | Aug. 2, 1932 |
| 2,243,086 | Buettell | May 27, 1941 |
| 2,297,303 | Humfeld | Sept. 29, 1942 |
| 2,441,817 | Huff | May 18, 1948 |
| 2,449,521 | Warner | Sept. 14, 1948 |
| 2,552,193 | Lennox | May 8, 1951 |

FOREIGN PATENTS

| | | |
|---|---|---|
| 225,010 | Switzerland | Apr. 1, 1943 |
| 877,264 | France | Sept. 1, 1942 |
| 911,957 | France | Apr. 8, 1946 |
| 926,788 | France | Apr. 21, 1947 |